United States Patent
Gautier et al.

(10) Patent No.: US 7,640,752 B2
(45) Date of Patent: Jan. 5, 2010

(54) DEVICE FOR GUIDING AN ELEMENT IN AN ORIFICE IN A WALL OF A TURBOMACHINE COMBUSTION CHAMBER

(75) Inventors: Claude Gautier, Savigny le Temple (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 535 days.

(21) Appl. No.: 11/527,498

(22) Filed: Sep. 27, 2006

(65) Prior Publication Data

US 2007/0068166 A1 Mar. 29, 2007

(30) Foreign Application Priority Data

Sep. 29, 2005 (FR) .................................. 05 09925

(51) Int. Cl.
 *F02C 7/00* (2006.01)
(52) U.S. Cl. ...................... 60/796; 60/39.827; 60/39.83
(58) Field of Classification Search ............. 60/39.821, 60/39.826, 39.827, 39.828, 39.83, 796
 See application file for complete search history.

(56) References Cited

U.S. PATENT DOCUMENTS

| 3,990,834 | A | 11/1976 | DuBell et al. | |
|---|---|---|---|---|
| 6,557,350 | B2 * | 5/2003 | Farmer et al. | .................. 60/776 |
| 7,216,488 | B2 * | 5/2007 | Howell et al. | .................. 60/776 |
| 2007/0051110 | A1 * | 3/2007 | Holland et al. | ................. 60/776 |

FOREIGN PATENT DOCUMENTS

| EP | 1 424 469 A2 | 6/2004 |
|---|---|---|
| FR | 2 856 466 | 12/2004 |

* cited by examiner

*Primary Examiner*—Louis J Casaregola
(74) *Attorney, Agent, or Firm*—Oblon, Spivak, McClelland, Maier & Neustadt, L.L.P.

(57) ABSTRACT

Device for guiding an element in an orifice in a wall of a turbomachine combustion chamber, including a ring and a bush, the ring being traversed axially by the element and including an external annular rim guided transversely in an internal annular channel of the bush, the ring and the bush delimiting around the element a cylindrical annular passage opening into the chamber, air circulation being provided in the ring and/or in the bush and distributed about their axis so as to establish an air circulation in the cylindrical passage from the outside of the combustion chamber toward the inside.

12 Claims, 3 Drawing Sheets

DEVICE FOR GUIDING AN ELEMENT IN AN ORIFICE IN A WALL OF A TURBOMACHINE COMBUSTION CHAMBER

BACKGROUND OF THE INVENTION AND DESCRIPTION OF THE PRIOR ART

The present invention relates to a device for guiding an element, such as a spark igniter or a starting injector, extending in an orifice in a wall of a turbomachine combustion chamber.

An annular turbomachine combustion chamber is delimited by coaxial axisymmetric walls which extend one inside the other and which are connected at their upstream ends by an annular chamber endwall comprising air supply orifices and fuel feed means.

The external wall of the chamber comprises, in the vicinity of its upstream end, at least one passage orifice for a spark igniter intended to initiate the combustion of the fuel/air mixture in the chamber. In certain cases, starting injectors, independent of the aforementioned fuel feed means, are likewise mounted in orifices in the external wall and distributed about the axis of the chamber, in order to improve initiation of the combustion of the air/fuel mixture in the chamber, one of these injectors being situated in the vicinity of the or of each spark igniter.

During operation of the turbomachine, the internal and external walls of the combustion chamber expand thermally and are subjected to considerable vibrations, which leads to relative displacements between the external wall of the chamber and the elements (igniters and starting injectors) which are mounted in orifices in this wall and which are supported by an external casing of the combustion chamber.

To compensate for these relative displacements, use is made of devices for guiding these elements which each comprise a ring and a bush which are substantially coaxial and mounted one inside the other, the ring being intended to be traversed axially by the element and comprising an external annular rim guided transversely in an internal annular channel of the bush which is intended to be fastened to the edge of the orifice in the external wall of the chamber.

The ring and the bush delimit around the element a cylindrical annular passage opening into the chamber and inside which can penetrate small quantities of air/fuel mixture which, after a certain time, result in the formation of coke between the device and the element and may therefore interfere with the guidance of the element by the device. Furthermore, the formation of coke may promote the creation of hot points that can weaken the device and the element. Finally, the deposition of coke on a spark igniter may disturb the ignition of the air/fuel mixture.

SUMMARY OF THE INVENTION

The object of this invention in particular is to provide a simple, effective and economic solution to this problem.

To this end, it provides a device for guiding an element in an orifice in a wall of a turbomachine combustion chamber, comprising a ring and a bush which are substantially coaxial and mounted one inside the other, the ring being intended to be traversed axially by the element and comprising an external annular rim guided transversely in an internal annular channel of the bush intended to be fastened to the edge of the orifice in the wall of the combustion chamber, the ring and the bush delimiting around the element a cylindrical annular passage opening into the chamber, wherein the device comprises air circulation means formed in the ring and/or in the bush and distributed about their axis so as to establish an air circulation in the cylindrical passage from the outside of the combustion chamber toward the inside.

The air circulation means make it possible to ventilate the cylindrical passage by feeding in air from the outside of the chamber toward the inside of the combustion chamber, thereby preventing the air/fuel mixture from penetrating the cylindrical passage and remaining therein, and therefore reducing or avoiding the risk of coke formation, which may interfere with the guidance of the element.

The element guided in the orifice in the wall of the chamber may be a spark igniter or a starting injector. When the element is a spark igniter, the invention also makes it possible to prevent the ignition of the air/fuel mixture from being impeded by the presence of coke.

The air pressure drop between the outside and the inside of the chamber is substantially constant during operation and is, for example, around 4 to 5% irrespective of the engine speed, thereby ensuring an air intake into the cylindrical passage which represents about 0.3% of the air flow in the chamber.

In a first embodiment of the invention, the bush comprises a cylindrical wall externally delimiting the cylindrical passage formed around the element outside the combustion chamber, and the air circulation means comprise through orifices formed in this cylindrical wall of the bush and regularly distributed about the axis of the bush.

By way of a variant, or as an additional feature, the air circulation means comprise through orifices formed in the annular rim of the ring, these orifices being regularly distributed about the axis of the ring and opening into the cylindrical annular passage.

The orifices in the bush and/or in the ring make it possible to ventilate the cylindrical passage and prevent the formation of coke between the element and the bush and between the element and the ring. The orifices also make it possible to cool the bush and the ring by passing air through these orifices. They may extend radially or be inclined with respect to the axis of the ring and of the bush so as to increase the contact area between the air and the bush or the ring and therefore improve the cooling of the device.

The air circulation means may also comprise axial splines formed in an internal cylindrical surface of the ring serving for guiding the element, these splines being regularly distributed about the axis of the ring and opening at one of their ends into the annular passage and at the other of their ends outside the chamber.

The splines allow the passage of air from outside the chamber into the cylindrical passage, preventing the formation of coke between the guiding surface of the ring and the element and improving the axial sliding of the element in the ring.

The air circulation means may additionally comprise radial grooves formed in a transverse annular surface of the channel of the bush and/or in a transverse annular surface of the rim of the ring, these grooves being regularly distributed about the axis of the bush and of the ring and opening at one of their ends into the cylindrical annular passage and at the other of their ends outside the chamber.

These radial grooves also make it possible to feed in air from outside the chamber into the cylindrical passage and into the chamber. They prevent the formation of coke between the rim of the ring and the channel of the bush and improve the transverse sliding of the rim of the ring on the annular surface of the bush.

The bush may be fastened to the edge of the orifice in the wall of the combustion chamber by brazing or welding.

The present invention also relates to a turbomachine combustion chamber, which comprises at least one device as described above, and to a turbomachine, such as, in particular, an aircraft turbojet or turboprop, which comprises at least one device as described above.

BRIEF DESCRIPTION OF THE DRAWINGS

The invention will be better understood and other features, details and advantages thereof will become more clearly apparent on reading the following description given by way of nonlimiting example with reference to the appended drawings, in which.

DESCRIPTION OF THE PREFERRED EMBODIMENTS

Figure 1:
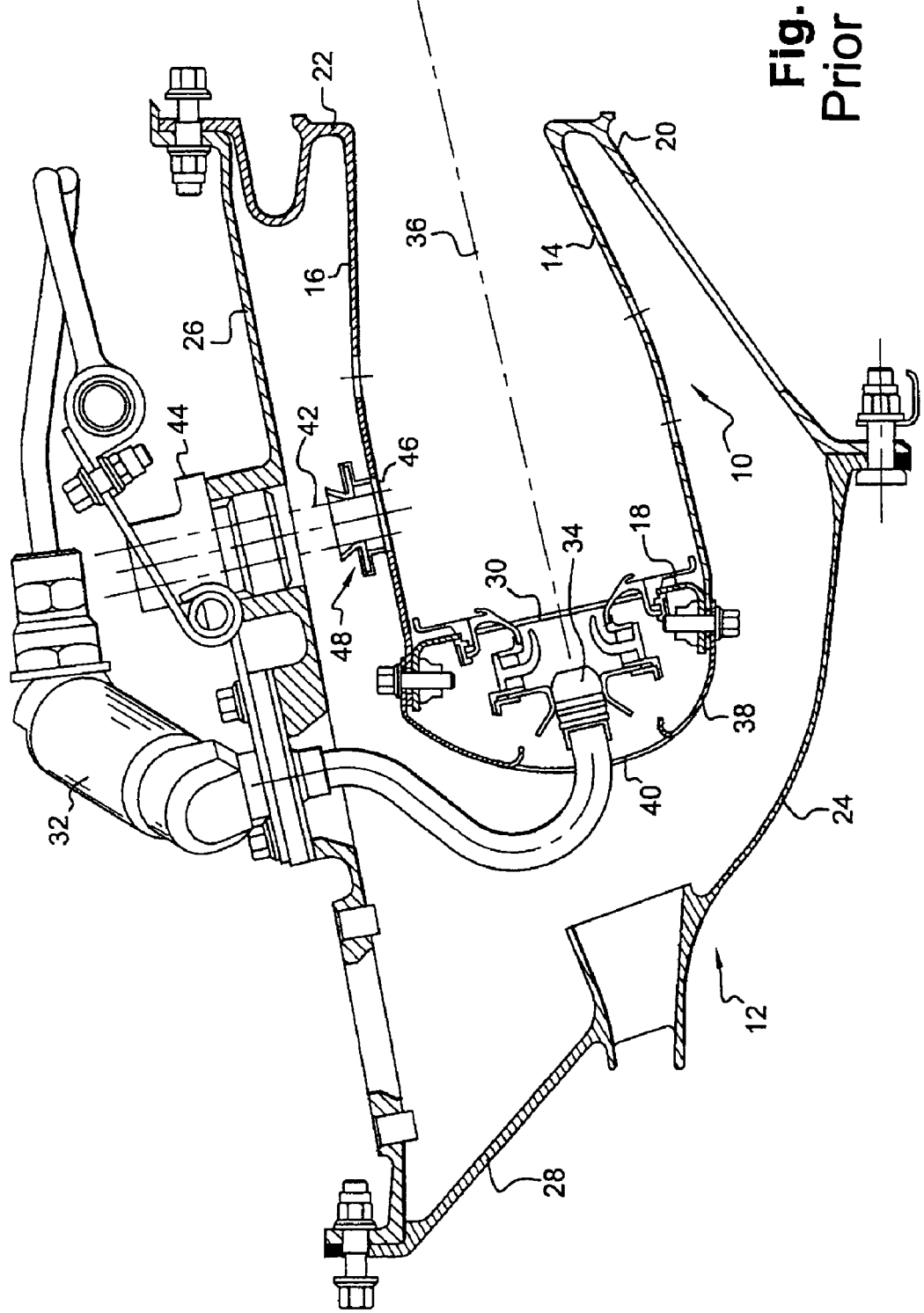
FIG. 1 is a schematic half-view in axial section of a combustion chamber of a turbomachine equipped with a prior art device for guiding an element.

In FIG. 1, an annular combustion chamber 10 is arranged at the outlet of a diffuser 12, itself situated at the outlet of a compressor (not shown), and comprises an internal axisymmetric wall 14 and an external axisymmetric wall 16 which are connected upstream to an annular chamber endwall 18 and fastened downstream by respective internal 20 and external 22 annular flanges to an internal frustoconical shell 24 of the diffuser and to a downstream end of an external casing 26 of the chamber, the upstream end of this casing 26 being fastened to an external frustoconical shell 28 of the diffuser.

The chamber endwall 18 comprises orifices 30 through which air from the diffuser 12 and fuel fed in by injectors 32 pass, said injectors being fastened to the external casing 26 and being regularly distributed around a circumference about the longitudinal axis A of the chamber. Each injector 32 comprises a fuel injection head 34 mounted on the chamber endwall 18 and aligned with the axis 36 of one of the orifices 30 in this wall. An annular cap 38, which is curved toward the upstream end, is fastened to the upstream ends of the walls 14, 16 and 18 of the chamber and comprises air passage orifices 40 aligned with the orifices 30 in the chamber endwall 18.

The fuel injected into the chamber 10 mixes with the air from the diffuser and is ignited by means of one or two spark igniters, such as the one schematically represented in broken lines 42, which extend radially outside the chamber and are diametrically opposed with respect to the axis A. These igniters 42 are guided at their internal end in an orifice 46 in the external wall 16 of the chamber and their other external end is fastened by suitable means 44 to the external casing 26 and connected to electrical power supply means (not shown) situated outside the casing 26.

Devices 48 for guiding the internal ends of the spark igniters are fastened outside the chamber 10 to the external wall 16, around the orifices 46, in order to compensate for the relative displacements between the external wall 16 of the chamber and the igniters 42 supported by the casing 26 during the operation of the turbomachine.

Figure 2:
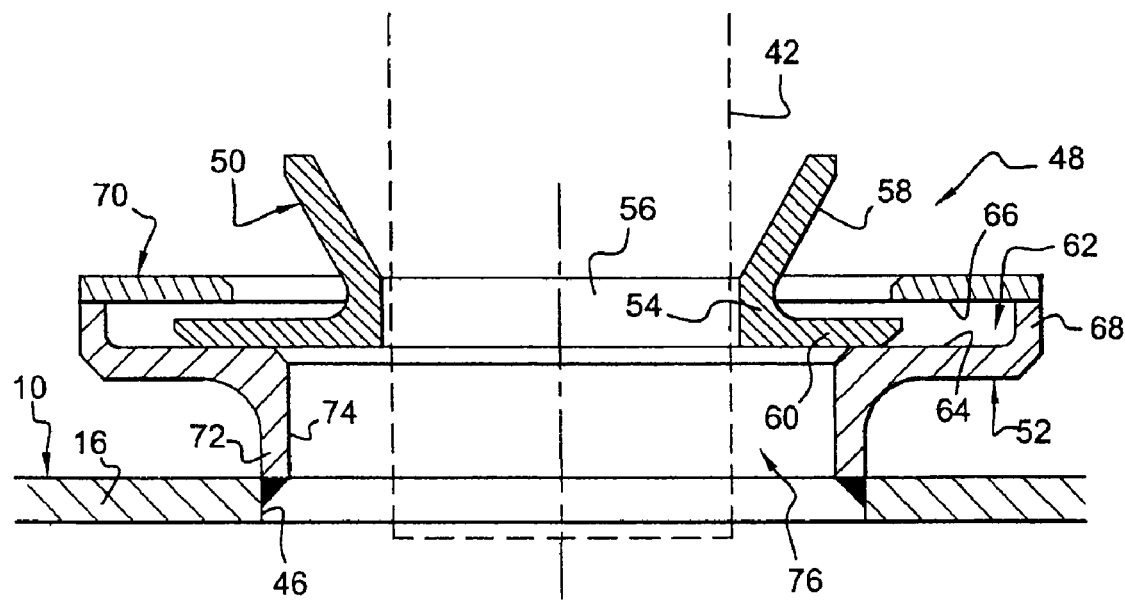
FIG. 2 is a schematic view of the guiding device shown in FIG. 1 on an enlarged scale.

This guiding device 48, better visible in FIG. 2, comprises a ring 50 traversed axially by the igniter 42 and mounted inside one end of a coaxial bush 52, the other end of which is fastened by brazing, welding or the like to the external wall 16 of the chamber, around the igniter passage orifice 46.

The ring 50 comprises a cylindrical part 54 whose internal surface 56 surrounds the igniter 42 with a slight clearance and serves for guiding said igniter in an axial direction. This cylindrical part 54 is connected at its end situated on the side opposed to the chamber to an outwardly flared frustoconical part 58 which serves for guiding the igniter when it is mounted in the device, and comprises at its other end an annular rim 60 which extends radially outward with respect to the axis of the ring 50 and which is guided in an internal annular channel 62 of the bush 52, situated on the side opposed to the chamber 10.

The annular channel 62 of the bush is delimited axially by two annular surfaces 64, 66 which extend radially with respect to the axis of the bush 52 and which are connected to one another at their external peripheries by a cylindrical wall 68 of the bush. The annular surfaces 64, 66 make it possible for the external rim 60 of the ring to be guided in a radial or transverse plane with respect to the axis of the bush. In the example represented, the cylindrical wall 68 and the annular surface 64 situated on the side toward the chamber are formed by a collar of the bush 52 and the annular surface 66 situated on the side opposed to the chamber is formed by a washer 70 or plate which is added and welded onto the end of the cylindrical wall 68.

The outside diameter of the annular rim 60 of the ring 50 is smaller than the inside diameter of the cylindrical wall 68 of the bush 52, and the outside diameter of the cylindrical part 54 of the ring is smaller than the inside diameter of the washer 70, in order to allow displacements of the rim 60 of the ring in the channel 62 in a transverse plane. The axial dimension or thickness of the external rim 60 of the ring is also smaller than the axial dimension of the channel 62 of the bush in order to allow angular offsets between the axes of the ring 50 and of the bush 52.

The end of the bush 52 fastened to the external wall 16 is formed by a cylindrical wall 72 whose internal surface 74 externally delimits around the igniter 42 a cylindrical annular passage 76 which opens into the chamber 10 through the igniter passage orifice 46. In the example represented, the diameter of the internal surface 74 of the bush is greater than the diameter of the cylindrical surface 56 of the ring and slightly smaller than the diameter of the igniter passage orifice 46.

During operation, small quantities of air/fuel mixture can penetrate the cylindrical passage 76 from outside the chamber and, after a certain time, result in the formation and accumulation of coke between the ring 50, the bush 52 and the igniter 42. As no means is provided to eliminate this coke, it may in the long term prevent the displacement of the ring 50 in the bush and impede the ignition of the air/fuel mixture.

The present invention makes it possible to avoid these disadvantages by virtue of air circulation means which allow air to be fed in from outside the chamber into the annular cylindrical passage delimited by the guiding device around the igniter, thereby preventing the air/fuel mixture from penetrating this cylindrical passage and forming coke therein.

Figure 3:
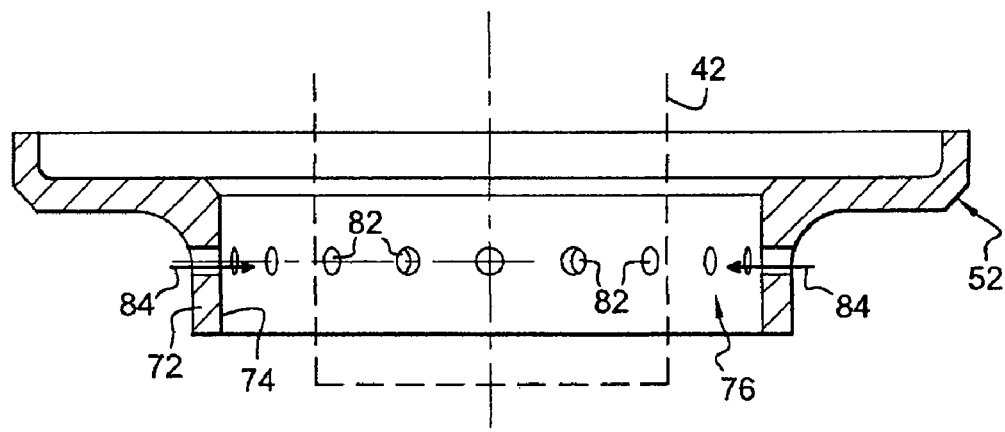
FIG. 3 is a schematic view in axial section of an embodiment of the bush of the guiding device according to the invention.

In a first embodiment represented in FIG. 3, the air circulation means comprise through orifices 82 formed in the cylindrical wall 72 of the bush and regularly distributed about the axis of the bush. The air outside the chamber enters the cylindrical passage 76 by passing through the orifices 82, as indicated by the arrows 84, and forms jets which strike against the igniter, thereby making it possible to prevent the formation of coke in the cylindrical passage 76 and at the same time to cool the wall 72 of the bush and the igniter.

In the example represented, the orifices 82 are identical and extend substantially radially with respect to the axis of the bush.

By way of a variant, the orifices 82 in the cylindrical wall of the bush may have different dimensions and be inclined with respect to the axis of the bush so as to increase the time during which the air remains in the orifices, thus improving the cooling of the bush.

In an exemplary embodiment in which the diameter of the igniter is between 8 and 12 mm and the diameter of the surface 74 of the bush is around 15 mm, the orifices 82 have a diameter of between 0.5 and 1.5 mm, and there are from 15 to 25 of these orifices regularly distributed about the axis of the bush 52.

Figure 4:
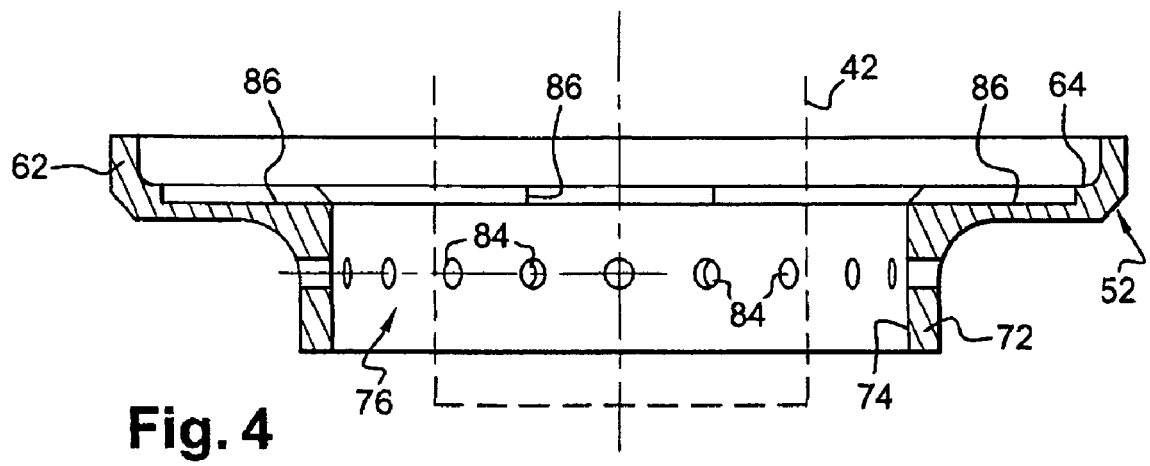
FIG. 4 is a schematic view in axial section of a variant embodiment of the bush of the guiding device according to the invention.

In the variant embodiment shown in FIG. 4, the bush 52 comprises, in addition to the radial orifices 82 formed in the cylindrical wall 72, radial grooves 86 which are formed in the annular surface 64 of the channel for guiding the rim 60 of the ring. Their internal ends open into the cylindrical passage 76 and their external ends are situated around a circumference centered on the axis of the bush and the diameter of which is greater than the outside diameter of the annular rim 60 of the ring in order that these external ends open into the channel 62 and communicate with the outside of the chamber, for example via air passage openings formed in the washer 70 or between the washer 70 and the cylindrical wall 68 of the bush. In the example represented, there are four radial grooves 86 regularly distributed about the axis of the bush.

The air which passes into the grooves 86, between the radial annular surfaces of the ring and of the bush, makes it possible to ventilate the cylindrical passage 76 and improve the transverse guidance of the rim 60 of the ring in the channel of the bush.

Figure 5:
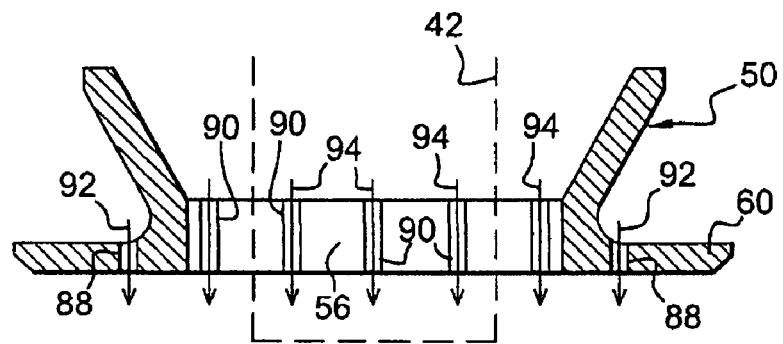
FIG. 5 is a schematic view in axial section of an embodiment of the ring of the guiding device according to the invention.

In the embodiment represented in FIG. 5, the air circulation means comprise through orifices 88 formed in the annular rim 60 of the ring and splines 90 formed in the internal cylindrical surface 56 of the ring, the orifices 88 and the splines 90 being regularly distributed about the axis of the ring and opening into the cylindrical passage 76.

The orifices 88 are situated around a circumference centered on the axis of the ring and the diameter of which is smaller than the inside diameter of the washer 70 and than the diameter of the cylindrical surface 74 of the bush so that air can circulate in the cylindrical passage from outside the chamber, passing between the washer 70 of the bush and the cylindrical part 54 of the ring and through the orifices 88, as indicated by the arrows 92. These orifices 88 may be parallel to the axis of the ring, as represented, or inclined with respect to this axis so as to increase the time during which the air remains in the ring and increase the cooling of the ring, as described above with reference to FIG. 3.

The splines 90 extend over the whole axial dimension of the cylindrical surface 56 and allow air to circulate between the outside of the chamber and the cylindrical passage 76, as indicated by the arrows 94. In the example represented, the splines are rectilinear and parallel to the axis of the ring, and there are ten of them.

Figure 6:
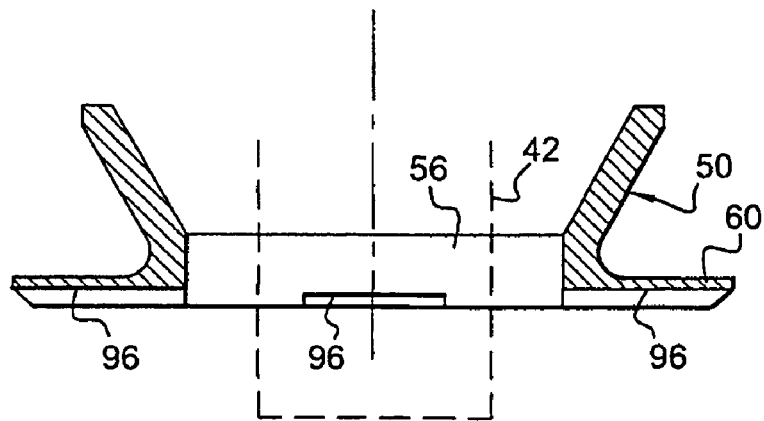
FIG. 6 is a schematic view in axial section of a variant embodiment of the ring of the guiding device according to the invention.

In the variant embodiment of FIG. 6, the air circulation means of the ring 50 comprise radial grooves 96 which are formed in the radially internal annular surface of the rim 60 of the ring, facing the guiding surface 64 of the bush, and which extend over the whole radial dimension of the rim 60, thus opening at their internal ends into the cylindrical passage 76 and at their external ends into the annular channel 62 which communicates with the outside of the chamber, as described above with reference to FIG. 4. In the example represented, there are four radial grooves 96 which are regularly distributed about the axis of the bush. As in the embodiment shown in FIG. 4, these grooves 96 make it possible to ventilate the cylindrical passage 76 and to improve the transverse guidance of the rim of the ring in the channel of the bush.

The element 42 represented in the drawings may also be a starting injector which differs from and is independent of the injectors 32 described above and which is intended to be mounted in a radial orifice in the external wall 16 of the chamber, in particular in the vicinity of a spark igniter, for the purpose of spraying fuel onto the electrical arc generated by the igniter so as to improve and accelerate the propagation of the combustion inside the chamber.

Of course, the invention is not restricted to the embodiments which have been described in the foregoing and represented in the appended drawings. The guiding device according to the invention may, for example, comprise only one or a combination of the air circulation means which have been described, from among the following: the through orifices 82 in the cylindrical wall 72 of the bush (FIG. 3), the radial grooves 86 in the annular surface of the bush for guiding the external rim of the ring (FIG. 4), the splines 90 in the cylindrical surface of the ring for guiding the element (FIG. 5), the through orifices 88 in the external rim of the ring (FIG. 5), and the radial grooves 96 in the annular surface of the external rim of the ring guided in the channel 62 of the bush (FIG. 6).

The invention claimed is:

1. A device for guiding an element in an orifice in a wall of a turbomachine combustion chamber, comprising a ring and a bush which are substantially coaxial and mounted one inside the other, the ring being intended to be traversed axially by the element and comprising an external annular rim guided transversely in an internal annular channel of the bush intended to be fastened to the edge of the orifice in the wall of the combustion chamber, the ring and the bush delimiting around the element a cylindrical annular passage opening into the chamber, wherein the device comprises an air circulation circuit formed in the ring and/or in the bush and distributed about their axis so as to establish an air circulation in the cylindrical passage from the outside of the combustion chamber toward the inside,
   wherein said ring comprises a frustoconical part connected to the ring between the external annular rim of the ring and an internal cylindrical surface situated between said frustoconical part and said element, and
   wherein the air circulation circuit comprises axial splines formed in said internal cylindrical surface of the ring, said splines being regularly distributed around the axis of the ring.

2. The device as claimed in claim 1, wherein the bush comprises a cylindrical wall externally delimiting the cylindrical passage formed around the element outside the combustion chamber, and wherein the air circulation circuit comprises through orifices formed in this cylindrical wall of the bush and regularly distributed about the axis of the bush.

3. The device as claimed in claim 2, wherein the orifices of the cylindrical wall of the bush extend radially with respect to the axis of the bush.

4. The device as claimed in claim 2, wherein the orifices of the cylindrical wall of the bush are inclined with respect to the axis of the bush.

5. The device as claimed in claim 1, wherein the air circulation circuit comprises through orifices formed in the annular rim of the ring, these orifices being regularly distributed about the axis of the ring and opening into the cylindrical annular passage.

6. The device as claimed in claim 1, wherein the air circulation circuit comprises radial grooves formed in a transverse annular surface of the channel of the bush and/or in a transverse annular surface of the rim of the ring, these grooves being regularly distributed about the axis of the bush and of the ring.

7. The device as claimed in claim 6, wherein the grooves open at one of their ends into the cylindrical annular passage and at the other of their ends outside the chamber.

8. The device as claimed in claim 1, wherein the bush is fastened to the wall of the chamber by brazing or welding.

9. The device as claimed in claim 1, wherein the element guided in the orifice in the wall of the chamber is a spark igniter.

10. The device as claimed in claim 1, wherein the element guided in the orifice in the wall of the chamber is a starting injector.

11. A turbomachine combustion chamber which comprises at least one device as claimed in claim 1.

12. An aircraft turbojet comprising at least one device as claimed in claim 1.

* * * * *